United States Patent
Uehara

(10) Patent No.: US 8,772,363 B2
(45) Date of Patent: Jul. 8, 2014

(54) CARRIER FOR FLUID TREATMENT AND METHOD OF MAKING THE SAME

(75) Inventor: Tsutomu Uehara, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 1180 days.

(21) Appl. No.: 12/193,998

(22) Filed: Aug. 19, 2008

(65) Prior Publication Data

US 2009/0124717 A1    May 14, 2009

(30) Foreign Application Priority Data

Aug. 23, 2007    (JP) ................................. 2007-217130
Jul. 15, 2008    (JP) ................................. 2008-184160

(51) Int. Cl.
*C08J 9/00*      (2006.01)
*B29C 44/34*      (2006.01)
*C02F 3/10*      (2006.01)

(52) U.S. Cl.
CPC ......... B29C 44/3461 (2013.01); *C08J 2201/03* (2013.01); *C08J 2323/02* (2013.01); *C08J 9/0061* (2013.01); *C08J 2401/00* (2013.01); *C02F 3/10* (2013.01)
USPC ............. 521/79; 521/84.1; 521/142; 521/143

(58) Field of Classification Search
CPC .. C08J 9/0061; C08J 2201/03; C08J 2323/02; C08J 2401/00
USPC .................................... 521/79, 84.1, 142, 143
See application file for complete search history.

(56) References Cited

U.S. PATENT DOCUMENTS

| | | | | | |
|---|---|---|---|---|---|
| 3,867,319 | A | * | 2/1975 | Lundberg | ........................ 521/88 |
| 4,187,067 | A | * | 2/1980 | Mizuno et al. | ................ 425/313 |
| 4,493,788 | A | * | 1/1985 | Fujie et al. | .................... 252/511 |
| 6,124,370 | A | * | 9/2000 | Walton et al. | ................. 521/143 |
| 2004/0147625 | A1 | * | 7/2004 | Dostal et al. | .................... 521/79 |

FOREIGN PATENT DOCUMENTS

| | | |
|---|---|---|
| JP | 2000007805 A * | 1/2000 |
| JP | 2003-055562 | 2/2003 |
| JP | 2001-327285 | 11/2011 |
| JP | 2006-219541 | 3/2013 |
| WO | WO94/26086 | 11/1994 |

OTHER PUBLICATIONS

Material Safety Data Sheet Sodium Bicarbonate, Fischer Scientific, 2012.*
Sodium Bicarbonate, MSDS Solvay Chemicals, Jun. 2004.*

\* cited by examiner

*Primary Examiner* — Irina S Zemel
(74) *Attorney, Agent, or Firm* — Tracy M. Heims; Apex Juris, pllc

(57) ABSTRACT

A foam containing 30 to 95% by weight of a polyolefin-based resin and 5 to 70% by weight of a hydrophilizing agent composed of a cellulose-based powder, the surface of the foam being in a melt fractured state.

21 Claims, No Drawings

CARRIER FOR FLUID TREATMENT AND METHOD OF MAKING THE SAME

BACKGROUND OF THE INVENTION

1. Field of the Invention

The present invention relates to a carrier for fluid treatment composed of a polyolefin-based foam and a method of making the same, the carrier providing excellent fluid treatment performance such as water-sinking properties.

2. Description of the Related Art

Heretofore, foams composed of polyolefin resins or the like have been widely used as carriers for microorganism immobilization for water treatment such as BOD treatment, nitration treatment, and denitrification treatment. However, such foams exhibit poor water wettability and water-sinking properties because they are composed mainly of hydrophobic resins and contain many closed cells and half-through cells. Therefore, there is no carrier for water treatment composed of a polyolefin-based resin foam having sufficient water treatment capacity.

For example, Japanese Patent Application Laid-Open (JP-A) No. 2004-224904 suggests a method of making a crosslinked polyethylene-based resin by two-stage foaming under a batch method, wherein a polyethylene-based resin is mixed with a crystallization promoter, a foaming agent, and a cross-linking agent to produce a foaming resin composition, the composition is filled in a closed mold, heated under pressure to produce an intermediate foam, subsequently the intermediate foam is heated under normal pressure to decompose the residual foaming agent and cross-linking agent, and thus a foam is obtained.

However, the making method suggested in JP-A No. 2004-224904 is a batch method with a low production efficiency, and the foam produced in the foaming step is inhomogeneous. In addition, two-stage foaming is inefficient, and the resultant foam floats on water because it contains many closed cells and half-through cells, and thus is unsuitable as a carrier for water treatment or microorganism immobilization.

Japanese Patent Application Laid-Open (JP-A) No. 11-315161 suggests a method of making a crosslinked polyolefin open-cell foam, wherein polyolefin is mixed with a foaming agent and a cross-linking agent to produce a foaming cross-linking composition, and the composition is heated and foamed in an unclosed mold to produce a foam, and then the foam is mechanically deformed thereby communicating cells with each other.

However, the making method suggested in JP-A No. 11-315161 is inefficient because it involves two steps of producing a foam and mechanically deforming the foam thereby communicating cells with each other. Examples of common techniques for producing an open-cell foam include a drop-foaming method and a sintering method of making a porous body. However, these methods are inefficient.

Japanese Patent Application Publication (JP-B) No. 3143412 suggests an invention of a microorganism immobilizing carrier for fluidized-bed including an extruded foam composed mainly of a polyolefin-based resin, wherein the extruded foam contains open cells communicating with the foam surface and closed cells not communicating with the foam surface, and the proportion of the open cells in the extruded foam is from 20 to 70%.

The microorganism immobilizing carrier according to the invention suggested in JP-B No. 3143412 contains open cells composed of through cells, at least two points of which communicate with the foam surface, and half-through cells, a single point of which communicates with the foam surface. In any case, a formation of open cells requires two steps, or foaming and communicating cells with each other, which results in low productivity. In addition to closed cells, if the foam contains half-through cells in the open cells, the foam floats on water and thus unsuitable for uses as a microorganism carrier. If the proportion of the open cells is from 20 to 70%, the expansion ratio is from 1.25 to 3.3. The expansion ratio is too low and the production efficiency is low. Furthermore, the expansion ratio achieved by extrusion molding is about 10 for closed cells, but at most 3 for open cells.

For example, Japanese Patent Application Laid-Open (JP-A) Nos. 5-228980 and 5-230254 describe the inventions of the methods for continuous production of foams composed mainly of a polypropylene resin by extrusion-foam molding. According to the inventions suggested in JP-A Nos. 5-228980 and 5-230254, the expansion ratio is 10, but the foams are composed of closed cells, and thus unsuitable for carriers for water treatment or microorganism immobilization.

As described above, highly expanded foams composed of open cells (water-sinking highly expanded foams) can be produced only by a batch method, and continuous production of such foams is believed to be impossible.

SUMMARY OF THE INVENTION

The present invention is intended to provide a novel carrier for fluid treatment and a novel method of continuously making the carrier, the carrier having excellent water-sinking properties and microorganism immobilization properties, and being applicable to liquids other than water and fluids such as gas.

A structure of the carrier for fluid treatment of the present invention intended to solve the problem, comprises a foam containing 30 to 95% by weight of a polyolefin-based resin, and 5 to 70% by weight of a cellulose-based powdery hydrophilizing agent, wherein the surface of the foam is in a melt fractured state.

Also, another structure of the carrier for fluid treatment of the present invention intended to solve the problem, comprises a foam containing 30 to 95% by weight of a polyolefin-based resin, 4 to 69% by weight of a cellulose-based powdery hydrophilizing agent, and 1 to 30% by weight of an inorganic powder, wherein the surface of the foam is in a melt fractured state.

In the carrier structure of the present invention, the melt fractured state has a specific surface area ratio represented by the following formula (1): $B/A=1.5$ to $4.0$, wherein A represents the apparent specific surface area of the foam, and B represents the true specific surface area of the foam.

In the carrier structure of the present invention, it is preferable that the hydrophilizing agent is exposed at or projecting from the surface of the foam. In addition, it is preferable that the polyolefin-based resin is a composition having a melt flow index of 5 to 25 g/10 min.

Moreover, in the carrier structure of the present invention, it is preferable that the polyolefin-based resin is polyethylene, a mixture of polyethylene and polypropylene, a mixture of polyethylene and ethylene-vinyl acetate copolymer, a mixture of polyethylene, polypropylene and ethylene-vinyl acetate copolymer, a mixture of polyethylene, polypropylene, and polystyrene, or a mixture of polyethylene, polypropylene, polystyrene, and ethylene-vinyl acetate copolymer.

Furthermore, in the carrier structure of the present invention, the foam has an expansion ratio of 2 to 10, and an apparent specific gravity of 0.10 to 0.80 g/ml.

Then, a structure of the method of making a carrier for fluid treatment intended to solve the problem, comprises steps of charging a foaming agent and a primary blend, which has been prepared by kneading a polyolefin-based resin and a hydrophilizing agent composed of a cellulose-based powder in a melt stirrer at a temperature not lower than the melting point of the polyolefin-based resin, followed by pulverization, or by kneading the ingredients in a multiscrew extruder at a temperature not lower than the melting point of the polyolefin-based resin, followed by pelletization, into a single screw or multiscrew extruder, kneading them, extrusion-foaming the kneaded mass in water, and then cutting the foamed mass with an underwater pelletizer, or extrusion-foaming the kneaded mass in a vapor phase, and then hot cutting the foamed mass to obtain a foam. The melting point of the blend here is the temperature at which the blend starts to change state just enough to flow and be poured into the die.

The another structure of the method of making a carrier for fluid treatment intended to solve the problem, comprises steps of charging a foaming agent and a primary blend, which has been prepared by kneading a polyolefin-based resin, a hydrophilizing agent composed of a cellulose-based powder, and an inorganic powder in a melt stirrer at a temperature not lower than the melting point of the polyolefin-based resin, followed by pulverization, or by kneading the ingredients in a multi-screw extruder at a temperature not lower than the melting point of the polyolefin-based resin, followed by pelletization, into a single screw or multiscrew extruder, kneading them, extrusion-foaming the kneaded mass in water, and then cutting the foamed mass with an underwater pelletizer, or extrusion-foaming the kneaded mass in a vapor phase, and then hot cutting the foamed mass to obtain a foam.

In the carrier for fluid treatment of the present invention intended to solve the problem, a structure example of another making method, comprises steps of charging a polyolefin-based resin, a hydrophilizing agent composed of a cellulose-based powder, a foaming agent, and optionally an inorganic powder into a multiscrew extruder and kneading them at a temperature not lower than the melting point of the polyolefin-based resin, extrusion-foaming the kneaded mass in water, and then cutting the foamed mass with an underwater pelletizer, or extrusion-foaming the kneaded mass in a vapor phase, and then hot cutting the foamed mass to obtain a foam.

In the structure of the making method of the present invention, the foaming agent is a chemical foaming agent, a physical foaming agent, or a self-supporting foaming agent which turns into hollow spherical particles having an outer wall upon foaming.

In the structure of the making method of the present invention, the nozzle temperature of the extruder is adjusted to a temperature in the range of 10° C. higher than the decomposition temperature or vaporization temperature of the foaming component contained in the foaming agent, to 60° C. higher than the melting point of the polyolefin-based resin thereby bringing the surface of the foam to a melt fractured state, and exposing or projecting the hydrophilizing agent from the surface of the foam.

The carrier for fluid treatment of the present invention is, regardless of the presence of closed cells in the foam composing the carrier, superior to known water carriers for fluid treatment in water permeability, water wettability, and water-sinking properties owing to the synergistic effect of the hydrophilizing agent contained in the foam and a melt fractured state formed on the surface of the foam.

More specifically, the carrier for fluid treatment of the present invention is composed of a foam having a rough surface in a melt fractured state (the surface has many microscopic asperities). Therefore, the foam has a large surface area, and a hydrophilizing agent is exposed at or projecting from the surface of the foam, which improves water permeability into the cells of the carrier and water-sinking properties of the foam. The increase of the surface area increases the amount of microorganisms deposited on the carrier, and improves the water treatment capacity of the carrier. When the carrier is used for a gas such as air, dust, moisture, and floating microorganisms contained in the gas are promptly and effectively adsorbed to and/or removed by the carrier.

In addition, according to the method of the present invention for making a carrier for fluid treatment, a carrier for fluid treatment composed of a foam having a high expansion ratio and excellent water-sinking properties can be produced by not a batch method but a continuous method. It has been difficult under known techniques, but the continuous method contributes to the improvement of the production efficiency and cost reduction.

DESCRIPTION OF THE PREFERRED EMBODIMENT

Embodiments of the present invention are described below.

EXAMPLE

A carrier for fluid treatment according to a first embodiment of the present invention is a foam containing 30 to 95% by weight of a polyolefin-based resin and 5 to 70% by weight of a hydrophilizing agent composed of a cellulose-based powder, the surface of the foam being in a melt fractured state. A carrier for fluid treatment according to a second embodiment of the present invention is a foam containing 30 to 95% by weight of a polyolefin-based resin, 4 to 69% by weight of a hydrophilizing agent composed of a cellulose-based powder, and 1 to 30% by weight of an inorganic powder, the surface of the foam being in a melt fractured state (hereinafter "carrier for fluid treatment" may be abbreviated as "foam").

Melt fracture refers to a commonly known phenomenon where asperities are formed on the surface of a molding during plastic molding (the surface has no smoothness). For example, melt fracture refers to a phenomenon where irregular asperities are formed and surface shine is extinguished during extrusion molding of a plastic material because of a predetermined condition due to an excessive increase of the internal pressure of an extruder, an excessive increase of the extrusion speed, or an excessive decrease of the temperature of the plastic material.

In the carrier for fluid treatment of the present invention, the melt fractured state preferably has a specific surface area ratio expressed by the following the formula (1):

$$B/A = 1.5 \text{ to } 4.0 \qquad (1)$$

wherein A represents the apparent specific surface area of the foam, and B represents the true specific surface area of the foam. The apparent specific surface area (A) refers to the specific surface area when the surface of the foam is smooth, or not in a melt fractured state, and the true specific surface area (B) refers to the actual specific surface area when the surface is in a melt fractured state. More specifically, the B/A value expressed by the formula (1) represents the rate of the increase of the specific surface area caused by the melt fracture. If the B/A value is less than 1.5, the contact area between the object to be treated and the carrier for fluid treatment decreases, which results in the deterioration of the treatment capacity. On the other hand, if the B/A value is more than 4.0, the melt fracture on the surface is readily shaven by the contact between the carriers for fluid treatment during use. The apparent specific surface area (A) and the true specific surface area (B) are measured with an automatic specific surface area/porous distribution measuring apparatus [Tristar 3000, manufactured by Shimadzu Corporation].

The polyolefin-based resin contained in the carrier for fluid treatment of the present invention preferably has a melt flow index of 5 to 25 g/10 min. If the melt flow index is less than 5 g/10 min, the polyolefin resin has poor flowability, and thus is unsuitable for molding a foam according to the below-described making method of the present invention. On the other hand, if the melt flow index is more than 25 g/10 min, the foam can be collapsed during molding. The melt flow index (hereinafter may be abbreviated as "MFI") is a scale representing the flowability of a molten resin. MFI is generally known as an index defined as the mass of a resin (unit: g/10 min) flowing in 10 minutes through a nozzle (orifice) having a specified dimension under a constant pressure and at a constant temperature.

The polyolefin-based resin is preferably, for example, polyethylene (hereinafter may be abbreviated as "PE"), polypropylene (hereinafter may be abbreviated as "PP"), an ethylene-vinyl acetate copolymer (hereinafter may be abbreviated as "EVA"), or polystyrene (hereinafter may be abbreviated as "PS"). These resins may be used alone, or may be combined as appropriate. Other thermoplastic resin component may be added to the resin. Examples of the other thermoplastic resin component include polyethylene terephthalate (PET), polyvinyl chloride (PVC), polyvinylidene chloride (PVDC), polycarbonate (PC), polyurethane (PU), polyamide (PA), polyacetal (POM), polylactic acid (PLA), polymethyl methacrylate (PMMA), and an ABS resin (ABS). The resin is particularly preferably polyethylene, and may be, insofar as the MFI is within the above-described range, a mixture of PE and PP, a mixture of PE and EVA, a mixture of PE, PP, and EVA, a mixture of PE, PP, and PS, a mixture of PE, PP, EVA, and PS, or a mixture of these resins and other thermoplastic resin. Specifically, the composition ratio (weight ratio) of PE, PP, EVA, and the other thermoplastic resin including PS is preferably 100 to 60:40 to 0:20 to 0:15 to 0 with reference to the total resin amount as 100. In order to improve the abrasion resistance of the carrier for fluid treatment of the present invention, the resin preferably contains EVA at a ratio of 10% by weight or more. These resins may be regenerated resins.

The hydrophilizing agent contained in the carrier for fluid treatment of the present invention is a cellulose-based powder. Examples of the cellulose-based powder include a wood powder, a cellulose powder, and a hemp cellulose powder, and specific examples thereof include sawdust, AVICEL (Registered Trademark), ARBOCEL (Registered Trademark), paper powder, cellulose beads, microcrystalline cellulose, and microfibrillated cellulose. Among them, wood powder is particularly preferable. These powders may be used alone, or in combination of two or more of them at an appropriate ratio. The hydrophilizing agent is in the form of, for example, spheres, ellipses, wedges, whiskers, or fibers, and may take other form. The particles of the hydrophilizing agent pass through a 200-mesh screen, preferably a 100-mesh screen, and more preferably a 40-mesh screen.

In the present invention, the hydrophilizing agent imparts fluid permeability to the foam containing closed cells. For that purpose, it is desirable that the hydrophilizing agent be exposed at or projecting from the surface of the foam. The term "exposed" means that a portion of the surface of the hydrophilizing agent is apparent at the surface of the foam, and the term "projecting" means that a portion of the hydrophilizing agent is projecting from the surface of the form. More specifically, "exposed at or projecting from" means that the hydrophilizing agent is entirely or partially embedded in the foam, and a portion of the surface of the hydrophilizing agent is apparent at the surface of the foam, or a portion of the hydrophilizing agent is projecting from the surface of the form.

The carrier of the present invention for fluid treatment is, as will be further detailed in the below-described making method, a foam produced through foaming with a foaming agent. Examples of the foaming agent include sodium bicarbonate (baking soda), and azodicarbonamide (ADCA). The foaming agent is not limited to these examples, and may be a chemical or physical foaming agent. Examples of the chemical foaming agent include azo compounds such as barium azodicarboxylate (Ba/AC), nitroso compounds such as N,N-dinitrosopentamethylenetetramine (DPT), hydrazine derivatives such as 4,4'-oxybis(benzenesulfonylhydrazide) (OBSH), semicarbazide compounds, azido compounds, triazole compounds, isocyanate compounds, bicarbonates such as sodium bicarbonate, carbonates, nitrites, hydrides, mixtures of sodium bicarbonate and acids (for example, sodium bicarbonate and citric acid), mixtures of hydrogen peroxide and enzymes, and mixtures of a zinc powder and acids. Examples of the physical foaming agent include aliphatic hydrocarbons (for example, butane, pentane, and hexane), chlorohydrocarbons (for example, dichloroethane and dichloromethane), chlorofluoro hydrocarbons (for example, trichloromonofluoromethane, dichlorodifluoromethane, dichloromonofluoromethane, and dichlorotetrafluoroethane), alternative chlorofluorocarbons, air, carbon dioxide, nitrogen gas, and water. Among them, sodium bicarbonate (sodium bicarbonate) is particularly preferable because it has a low decomposition temperature and is inexpensive.

Alternatively, the foaming agent may be a so-called self-supporting foaming agent (also referred to as independent foaming agent, microspheres, or heat expansive microcapsules). The self-supporting foaming agent turns into hollow spherical particles having an outer wall upon foaming. Therefore, even if the resin composition is extrusion-foamed in a vapor phase (e.g., air) not in water, the hollow portion of the foam is maintained without being collapsed, whereby a carrier for fluid treatment having an intended expansion ratio is obtained. In the self-supporting foaming agent, the polymer composing the outer wall is, for example, a vinylidene chloride-acrylonitrile copolymer or an acrylonitrile-methacrylonitrile copolymer, and the volatile liquid contained in the outer wall is, for example, isobutane or isopentane. Specific examples include EXPANCEL (Registered Trademark) (manufactured by Japan Fillite Co., Ltd.) and EPD-03 (manufactured by Eiwa Chemical Ind. Co., Ltd.). In the present invention, the hydrophilizing agent composed of a cellulose-based powder allows permeation of a fluid such as water into a foam produced using a self-supporting foaming agent, so that the resultant carrier has excellent water permeability.

The carrier of the present invention for fluid treatment according to the second embodiment contains a polyolefin-based resin, a hydrophilizing agent, and 1 to 30% by weight of an inorganic powder. Examples of the inorganic powder include barium sulfate, calcium carbonate, zeolite, talc, titanium oxide, potassium titanate, and aluminum hydroxide. Among them, barium sulfate is particularly preferable. These inorganic powders may be used alone, or in combination of two or more of them. The inorganic powder serves as cores during foaming, controls the specific gravity, and decreases the usage of the polyolefin-based resin and hydrophilizing agent thereby reducing the production cost.

The carrier of the present invention for fluid treatment preferably has an expansion ratio of 2 to 10, and an apparent specific gravity of 0.10 to 0.80 g/ml. The expansion ratio is achieved when 0.5 to 8 parts of the foaming agent is added to 100 parts of the carrier for fluid treatment having the structure of the first example (structure containing no inorganic powder), or 100 parts of the carrier for fluid treatment having the structure of second example (structure containing an inorganic powder). The term "part(s)" means "part(s) by weight" (hereinafter the same).

If the expansion ratio is less than 2, the specific gravity is too high, so that flowing of the foam in water requires a high power. On the other hand, if the expansion ratio is more than 10, the specific gravity is too small, so that the foam readily floats on water especially during treatment in water, and thus is unsuitable as a carrier for water treatment or microorganism immobilization.

The apparent specific gravity (unit: g/ml) is calculated from the weight of 30 ml (apparent volume) of a foam taken in a 50-ml graduated cylinder, and represents the substantial specific gravity of the carrier for fluid treatment of the present invention. The reason for this is that it is very difficult to determine the true volume of the carrier for fluid treatment of the present invention because the surface of the carrier is in a melt fractured state.

The method of making the carrier for fluid treatment of the present invention is described below. The foaming agent and ingredients used in the making method, such as a polyolefin-based resin, a hydrophilizing agent, and an inorganic powder are the same as that used for the above-described carrier for fluid treatment.

Examples of the making method of the present invention include a method including steps of charging a foaming agent and a primary blend, which has been prepared by kneading ingredients other than the foaming agent in a melt stirrer, followed by pulverization, into a single screw or twin screw extruder, kneading them, extrusion-foaming the kneaded mass in water, and then cutting the foamed mass with an underwater pelletizer, to obtain a foam (hereinafter referred to as making method A), and a method including steps of charging a foaming agent and a primary blend, which has been prepared by kneading ingredients other than the foaming agent in a twin screw extruder, followed by pelletization, into a single screw or twin screw extruder, kneading them, extrusion-foaming the kneaded mass in water, and then cutting the foamed mass with an underwater pelletizer (hereinafter referred to as making method B). When an extruded strand is cut in water with a cutter blade under rotating in contact with the front of a die, the operation is referred to as underwater cutting (JIS B 8650). In these making methods A and B, the primary blend is produced by kneading the ingredients at a temperature not lower than the melting point of the polyolefin-based resin as an ingredient. The foaming agent used herein may be a chemical foaming agent, a physical foaming agent, a self-supporting foaming agent, or a combination thereof. In particular, sodium bicarbonate is preferable because it has a low decomposition temperature and is inexpensive.

In the making methods A and B, when a self-supporting foaming agent is used as a whole or part of the foaming agent, the resin composition may be extrusion-foamed in a vapor phase in place of in water, followed by cutting to obtain a foam. When an extruded strand is cut in a vapor phase such as air with a cutter blade under rotating in contact with the front of a die, the operation is referred to as hot cutting (JIS B 8650).

The twin screw extruder is, for example, composed of two screws having an identical shape arranged in parallel with each other such that the threads of one screw are engaged in the grooves of other screw. The directions of rotation of the screws may be the same or the opposite. In any case, a strong shearing force is exerted within the molten material at the points where the screw grooves are engaged. Therefore, a twin screw extruder provides higher kneading effect and a higher extrusion pressure than those achieved by a single screw extruder. If cost circumstances permitted, a multiscrew extruder composed of three or more screws may be used in place of a twin screw extruder.

The ingredients other than the foaming agent are comprised of a polyolefin-based resin and a hydrophilizing agent (hereinafter referred to as ingredients [1]), or a polyolefin-based resin, a hydrophilizing agent, and an inorganic powder (hereinafter referred to as ingredients [2]). The ingredients [1] and [2] may be the above-described polyolefin-based resin, hydrophilizing agent, and inorganic powder. The foaming agent may be the above-described one.

The proportions of the ingredients follow the proportions of the ingredients of the carriers for fluid treatment according to the first and second examples described above. More specifically, when the ingredients [1] are used, 0.5 to 8 parts of a foaming agent is added to 100 parts of the carrier for fluid treatment having the structure of the first example (30 to 95% by weight of a polyolefin-based resin, 5 to 70% by weight of a hydrophilizing agent). When the ingredients [2] are used, 0.5 to 8 parts of a foaming agent is added to 100 parts of the carrier for fluid treatment having the structure of the second example (30 to 95% by weight of a polyolefin-based resin, 4 to 69% by weight of a hydrophilizing agent, and 1 to 30% by weight of an inorganic powder).

Another preferable example of the making method of the present invention includes steps of charging a foaming agent and the ingredients [1] or [2] into a twin screw extruder and kneading them at a temperature not lower than the melting point of the polyolefin-based resin, extrusion-foaming the kneaded mass in water, and cutting the foamed mass with an underwater pelletizer to obtain a foam (hereinafter referred to as making method C) (underwater cutting method) As is the case with the above-described methods, a multiscrew extruder composed of three of more screws may be used in place of a twin screw extruder.

In the making method C, when a self-supporting foaming agent is used as a whole or part of the foaming agent, the resin composition may be extrusion-foamed in a vapor phase in place of water, followed by cutting to obtain a foam (hot cutting method).

The polyolefin-based resin, hydrophilizing agent, inorganic powder, and foaming agent may be the above-described ones. The proportions of the ingredients follow the proportions of the ingredients of the carriers for fluid treatment according to the first and second examples described above. More specifically, when the ingredients [1] are used, 0.5 to 8 parts of a foaming agent is added to 100 parts of the carrier for fluid treatment having the structure of the first example (30 to 95% by weight of a polyolefin-based resin, 5 to 70% by weight of a hydrophilizing agent). When the ingredients [2] are used, 0.5 to 8 parts of a foaming agent is added to 100 parts of the carrier for fluid treatment having the structure of the second example (30 to 95% by weight of a polyolefin-based resin, 4 to 69% by weight of a hydrophilizing agent, and 1 to 30% by weight of an inorganic powder).

In the making methods A, B, and C of the present invention, a foam is obtained through extrusion-foaming from the nozzle of each extruder. At that time, the temperature of the nozzle of the single screw or twin screw extruder is preferably in the range of 10° C. higher than the decomposition temperature of the foaming component contained in the foaming agent, to 60° C. higher than the melting point temperature of the polyolefin-based resin. The nozzle temperature is controlled within the range thereby producing a melt fracture on the surface of the resultant foam, whereby the foam of the present invention having a surface from which a hydrophilizing agent is exposed or projected. Specifically, when polyethylene (melting temperature: 120° C.) is used as the polyolefin-based resin, and sodium bicarbonate is used as the foaming agent, the nozzle temperature is controlled within a temperature range of 160° C. to 180° C.

The conditions for producing carriers for fluid treatment by the making methods A and B of the present invention are described below. As described above, under the making methods A and B of the present invention, a primary blend is produced with a melt stirrer (the making method A-ingredients [1] and the making method A-ingredients [2]), or a twin screw extruder (the making method B-ingredients [1] and the making method B-ingredients [2]).

In the present invention, when the primary blend is produced by a melt stirrer (the making method A-ingredients [1] the making method A-ingredients [2]), melt-stirring is conducted for 15 to 20 minutes at a temperature of 150 to 200° C. and a rotation speed 100 to 150 rpm, though the conditions vary depending on the type of the polyolefin-based resin to be used.

Specific conditions are as follows.

When the polyolefin-based resin is composed of PE, the resin is melt-stirred for 15 minutes at a temperature of 150° C. and a stirring rotation speed of 100 rpm.

When the polyolefin-based resin is composed of a mixture of PE and PP, the resin is melt-stirred for 20 minutes at a temperature of 150° C. and a stirring rotation speed of 150 rpm.

When the polyolefin-based resin is composed of a mixture of PE, PP, and PS, the resin is melt-stirred for 20 minutes at a temperature of 180° C. and a stirring rotation speed of 150 rpm.

When the polyolefin-based resin is composed of PE and EVA, the resin is melt-stirred for 15 minutes at a temperature of 150° C. and a stirring rotation speed of 100 rpm.

When the polyolefin-based resin is composed of PE, PP, and EVA, the resin is melt-stirred for 20 minutes at a temperature of 150° C. and a stirring rotation speed of 150 rpm.

When the polyolefin-based resin is composed of PE, PP, PS, and EVA, the resin is melt-stirred for 20 minutes at a temperature of 200° C. and a stirring rotation speed of 150 rpm.

When the primary blend is produced with a twin screw extruder (the making method B-ingredients [1] and the making method B-ingredients [2]), as the conditions for twin screw kneading, the temperature within the cylinder of the twin screw extruder is differed among the ingredient inlet side, midsection, and nozzle side. In the present invention, a primary blend is produced by extrusion at an inlet side temperature of 130 to 160° C., a midsection temperature of 150 to 190° C., a nozzle side temperature of 170 to 210° C., and a screw rotation speed of 100 to 150 rpm, though the temperatures vary depending on the type of the polyolefin-based resin to be used.

Specific conditions are as follows.

When the polyolefin-based resin is composed of PE, the resin is extruded to produce a primary blend at an inlet side temperature of 130° C., a midsection temperature of 150° C., a nozzle side temperature of 170° C., and a screw rotation speed of 100 rpm.

When the polyolefin-based resin is composed of a mixture of PE and PP, the resin is extrusion-foamed to produce a primary extrusion mixture at an inlet side temperature of 150° C., a midsection temperature of 170° C., a nozzle side temperature of 190° C., and a screw rotation speed of 100 rpm.

When the polyolefin-based resin is composed of a mixture of PE, PP, and PS, the resin is extrusion-foamed to produce a primary extrusion mixture at an inlet side temperature of 160° C., a midsection temperature of 190° C., a nozzle side temperature of 210° C., and a screw rotation speed of 150 rpm.

When the polyolefin-based resin is composed of PE and EVA, the resin is extrusion-foamed to produce a primary extrusion mixture at an inlet side temperature of 130° C., a midsection temperature of 150° C., a nozzle side temperature of 170° C., and a screw rotation speed of 150 rpm.

When the polyolefin-based resin is composed of PE, PP, and EVA, the resin is extrusion-foamed to produce a primary extrusion mixture at an inlet side temperature 150° C., a midsection temperature of 170° C., a nozzle side temperature of 190° C., and a screw rotation speed of 150 rpm.

When the polyolefin-based resin is composed of PE, PP, PS, and EVA, the resin is extrusion-foamed to produce a primary extrusion mixture at an inlet side temperature of 160° C., a midsection temperature of 190° C., a nozzle side temperature of 210° C., and a screw rotation speed of 150 rpm.

In the making methods A and B of the present invention, the primary blend is mixed with a foaming agent, charged into and kneaded in a single screw or twin screw extruder, (1) extrusion-foamed in water, and cut with an underwater pelletizer to obtain a foam, or (2) extrusion-foamed in a vapor phase, and hot-cut to obtain a foam. In the present invention, the extrusion-foaming conditions are as follows, though the conditions vary depending on the type of the polyolefin-based resin to be used: the temperature within the cylinder of the single screw or twin screw extruder is adjusted to 120 to 150° C. at the inlet side, 150 to 200° C. at the midsection, and 150 to 220° C. at the nozzle side, and the screw rotation speed is adjusted to 50 to 150 rpm.

Specific conditions are as follows.

When the polyolefin-based resin is composed of PE, the resin is extrusion-foamed at an inlet side temperature of 150° C., a midsection temperature of 150° C., a nozzle side temperature of 160° C., and a screw rotation speed of 100 rpm.

When the polyolefin-based resin is composed of a mixture of PE and PP, the resin is extrusion-foamed at an inlet side temperature of 150° C., a midsection temperature of 150° C., a nozzle side temperature of 180° C., and a screw rotation speed of 100 rpm.

When the polyolefin-based resin is composed of a mixture of PE, PP, and PS, the resin is extrusion-foamed at an inlet side temperature of 150° C., a midsection temperature of 180° C., a nozzle side temperature of 200° C., and a screw rotation speed of 100 rpm.

When the polyolefin-based resin is composed of PE and EVA, the resin is extrusion-foamed at an inlet side temperature of 150° C., a midsection temperature of 150° C., a nozzle side temperature of 160° C., and a screw rotation speed of 125 rpm.

When the polyolefin-based resin is composed of PE, PP, and EVA, the resin is extrusion-foamed at an inlet side temperature of 150° C., a midsection temperature of 150° C., a nozzle side temperature of 180° C., and a screw rotation speed of 125 rpm.

When the polyolefin-based resin is composed of PE, PP, PS, and EVA, the resin is extrusion-foamed at an inlet side temperature of 150° C., a midsection temperature of 180° C., a nozzle side temperature of 200° C., and a screw rotation speed of 125 rpm.

The nozzle temperature of the single screw or twin screw extruder is controlled within the above-described temperature range.

The conditions for producing a carrier for fluid treatment by the making method C of the present invention is described below. As with the case with the making methods A and B, the making method C may use the ingredients [1] or [2]. In the making method C, the ingredients [1] or [2] are mixed with a foaming agent, the mixture is kneaded with a twin screw extruder at a temperature not lower than the melting point of the polyolefin-based resin, and (1) the kneaded mass is extrusion-foamed in water, and cut with an underwater pelletizer to obtain a foam, or (2) the kneaded mass is extrusion-foamed in a vapor phase, and hot cut to obtain a foam. As is the case with the above-described methods, the temperature within the cylinder of the twin screw extruder is differed among the ingredient inlet side, midsection, and nozzle side. In the present invention, the temperature within the cylinder of the twin screw extruder is adjusted to 120 to 150° C. at the inlet side, 150 to 200° C. at the midsection, and 150 to 220° C. at the nozzle side, and the screw rotation speed is adjusted to 50 to 175 rpm, though the conditions vary depending on the type of the polyolefin-based resin to be used.

Specific conditions are as follows.

When the polyolefin-based resin is composed of PE, the resin is extrusion-foamed at an inlet side temperature of 150° C., a midsection temperature of 160° C., a nozzle side temperature of 180° C., and a screw rotation speed of 150 rpm.

When the polyolefin-based resin is composed of a mixture of PE and PP, the resin is extrusion-foamed at an inlet side temperature of 150° C., a midsection temperature of 180° C., a nozzle side temperature of 200° C., and a screw rotation speed of 150 rpm.

When the polyolefin-based resin is composed of a mixture of PE, PP, and PS, the resin is extrusion-foamed at an inlet side temperature of 150° C., a midsection temperature of 200° C., a nozzle side temperature of 220° C., and a screw rotation speed of 150 rpm.

When the polyolefin-based resin is composed of PE and EVA, the resin is extrusion-foamed at an inlet side temperature of 150° C., a midsection temperature of 160° C., a nozzle side temperature of 180° C., and a screw rotation speed of 175 rpm.

When the polyolefin-based resin is composed of PE, PP, and EVA, the resin is extrusion-foamed at an inlet side temperature of 150° C., a midsection temperature of 180° C., a nozzle side temperature of 200° C., and a screw rotation speed of 175 rpm.

When the polyolefin-based resin is composed of PE, PP, PS, and EVA, the resin is extrusion-foamed at an inlet side temperature of 150° C., a midsection temperature of 200° C., a nozzle side temperature of 220° C., and a screw rotation speed of 175 rpm.

The nozzle temperature of the twin screw extruder is controlled within the above-described temperature range.

Regarding the making methods A, B, and C according to the present invention, the practical conditions for producing carriers for fluid treatment, and the results of the evaluation of the water treatment capacity of the carriers for fluid treatment are described below.

[Foam Production]

Table 1 shows the details about the polyolefin-based resins used in Examples and Comparative Examples of the present invention. All of the polyolefin-based resins are regenerated resins. Regenerated resins contain foreign matters other than PE (polyethylene) and PP (polypropylene). The foreign matters are composed mainly of PS (polystyrene), and may contain PET (polyethylene terephthalate) or aluminum (mainly an aluminum foil).

TABLE 1

| | | | Composition ratio (%) | | | |
| --- | --- | --- | --- | --- | --- | --- |
| Resin No. | Manufacturer | Trade name | PE | PP | PS, PET and the others | EVA |
| (1) | JFE Kankyo Corporation | J PELLET | 70 to 75 | 20 to 25 | 2 to 5 | 0 |
| (2) | Sankusu Limited Company | None | 68 to 76 | 17 to 19 | 5 to 15 | 0 |
| (3) | Yuzawa Clean Center | None | 60 to 75 | 20 to 30 | 5 to 11 | 0 |
| (4) | Taisei Plastic Co., Ltd. | G-20 | 100 | 0 | 0 | 0 |
| (5) | Japan Polyethylene Corporation | LJ802 | 100 | 0 | 0 | 0 |
| (6) | Japan Polypropylene Corporation | NOVATEC (Registered Trademark) PP (MA1B) | 0 | 100 | 0 | 0 |
| (7) | Du Pont-Mitsui Polychemicals Co., Ltd. | EV550 | 0 | 0 | 0 | 100 |

The ingredients used in Examples 1 to 16 of the present invention, and Comparative Example 1 are listed in Tables 2 and 3. Table 2 lists the results of Examples 1 to 8, and Table 3 lists the results of Examples 9 to 16 and Comparative Example 1. The polyolefin-based resins used in Examples 1 to 16 and Comparative Example 1 are any of the polyolefin-based resins listed in Table 1, or a combination of them.

TABLE 2

| | Example | | | |
|---|---|---|---|---|
| | 1 | 2 | 3 | 4 |
| Polyolefin resin | (4) 49 | (1) 80 | (4) 49 | (4) 49 |
| MFI | 10 | 15 | 10 | 10 |
| Hydrophilizing agent | Wood powder (Kaneki Sangyo) (100 mesh) 40 | Wood powder (Kaneki Sangyo) (100 mesh) 20 | Wood powder Kaneki Sangyo) (100 mesh) 40 | Hemp cellulose powder (Tosco Co., Ltd.) (100 mesh) 40 |
| Inorganic powder | Barium sulfate (Sakai Chemical Industry Co., Ltd., BD grade) 11 | 0 | Barium sulfate (Sakai Chemical Industry Co., Ltd., BD grade) 11 | Barium sulfate (Sakai Chemical Industry Co., Ltd., BD grade) 11 |
| Foaming agent | Sodium bicarbonate (Tosoh Corporation) 1 | Sodium bicarbonate (Tosoh Corporation) 1 | Sodium bicarbonate (Tosoh Corporation) 1 | Sodium bicarbonate (Tosoh Corporation) 1 |
| Self-supporting foaming agent | 0 | 0 | 0 | 0 |
| Apparent specific gravity (g/ml) | 0.55 | 0.45 | 0.37 | 0.28 |
| Specific surface area ratio (B/A) | 3.5 | 2.5 | | 3.1 |

| | Example | | | |
|---|---|---|---|---|
| | 5 | 6 | 7 | 8 |
| Polyolefin resin | (1) 45.5 (7) 9 | (1) 45.5 (7) 9 | (2) 45.5 (7) 9 | (3) 45.5 (7) 9 |
| MFI | 18 | 18 | 20 | 20 |
| Hydrophilizing agent | Wood powder (Kaneki Sangyo) (100 mesh) 45.5 | Wood powder (Kaneki Sangyo) (100 mesh) 45.5 | Wood powder (Kaneki Sangyo) (100 mesh) 45.5 | Wood powder (Kaneki Sangyo) (100 mesh) 45.5 |
| Inorganic powder | 0 | 0 | 0 | 0 |
| Foaming agent | Sodium bicarbonate (Tosoh Corporation) 1 | Sodium bicarbonate (Tosoh Corporation) 1 | Sodium bicarbonate (Tosoh Corporation) 1 | Sodium bicarbonate (Tosoh Corporation) 1 |
| Self-supporting foaming agent | 930MB120 (Japan Fillite Co., Ltd.) 1 | 930MB120 (Japan Fillite Co., Ltd.) 1 | 930MB120 (Japan Fillite Co., Ltd.) 1 | 930MB120 (Japan Fillite Co., Ltd.) 1 |
| Apparent specific gravity (g/ml) | 0.33 | 0.26 | 0.35 | 0.37 |
| Specific surface area ratio (B/A) | | 4.0 | | |

TABLE 3

|  | Example |  |  |  |  |
| --- | --- | --- | --- | --- | --- |
|  | 9 | 10 | 11 | 12 | 13 |
| Polyolefin resin | (1) 45.5 (7) 9 | (4) 41 (7) 9 | (4) 45 | (4) 45 | (4) 35 |
| MFI | 20 | 13 | 10 | 10 | 10 |
| Hydrophilizing agent | Wood powder (Kaneki Sangyo) (100 mesh) 45.5 | Wood powder (Kaneki Sangyo) (100 mesh) 25 | Wood powder (Kaneki Sangyo) (100 mesh) 27.5 | Wood powder (Kaneki Sangyo) (100 mesh) 27.5 | Wood powder (Kaneki Sangyo) (100 mesh) 35 |
| Inorganic powder | 0 | Barium sulfate (Sakai Chemical Industry Co., Ltd., BD grade) 25 | Barium sulfate (Sakai Chemical Industry Co., Ltd., BD grade) 27.5 | Barium sulfate (Sakai Chemical Industry Co., Ltd., BD grade) 27.5 | Barium sulfate (Sakai Chemical Industry Co., Ltd., BD grade) 30 |
| Foaming agent | Sodium bicarbonate (Tosoh Corporation) 1 | Sodium bicarbonate (Tosoh Corporation) 1 | Sodium bicarbonate (Tosoh Corporation) 1 | Sodium bicarbonate (Tosoh Corporation) 1 | Sodium bicarbonate (Tosoh Corporation) 1 |
| Self-supporting foaming agent | 930DU120 (Japan Fillite Co., Ltd.) 1 | 0 | 0 | 930DU120 (Japan Fillite Co., Ltd.) 0.5 | 0.5 |
| Apparent specific gravity (g/ml) | 0.28 | 0.38 | 0.41 | 0.32 | 0.73 |
| Specific surface area ratio (B/A) | 3.8 |  |  |  |  |

|  | Example |  |  | Comparative Example 1 |
| --- | --- | --- | --- | --- |
|  | 14 | 15 | 16 |  |
| Polyolefin resin | (5):(6) 30:20 | (5):(6) 27:18 (7) 5 | (5) 45 (7) 5 | (4) 49 |
| MFI | 24 | 24 | 22 | 10 |
| Hydrophilizing agent | Wood powder (Kaneki Sangyo) (100 mesh) 25 | Wood powder (Kaneki Sangyo) (100 mesh) 25 | Wood powder (Kaneki Sangyo) (100 mesh) 25 | Wood powder (Kaneki Sangyo) (100 mesh) 40 |
| Inorganic powder | Barium sulfate (Sakai Chemical Industry Co., Ltd., BD grade) 25 | Barium sulfate (Sakai Chemical Industry Co., Ltd., BD grade) 25 | Barium sulfate (Sakai Chemical Industry Co., Ltd., BD grade) 25 | Barium sulfate (Sakai Chemical Industry Co., Ltd., BD grade) 11 |
| Foaming agent | Sodium bicarbonate (Tosoh Corporation) 1 | Sodium bicarbonate (Tosoh Corporation) 1 | Sodium bicarbonate (Tosoh Corporation) 1 | Sodium bicarbonate (Tosoh Corporation) 1 |
| Self-supporting foaming agent | 0 | 0 | 0 | 0 |
| Apparent specific gravity (g/ml) | 0.62 | 0.53 | 0.42 | 0.55 |
| Specific surface area ratio (B/A) |  |  |  | 1.0 |

The proportions of the ingredients used in Examples 1 to 4 and Comparative Example 1 and production conditions are listed in Table 4.

The primary blend and the foaming agent at the proportions listed in Table 4 are charged into a single screw extruder, and extrusion-foamed through a nozzle in water under the

TABLE 4

|  |  | Example 1 | Example 2 | Example 3 | Example 4 | Comparative Example 1 |
|---|---|---|---|---|---|---|
|  |  | \multicolumn{5}{c}{Making method-ingredients} |
|  |  | Making method A-ingredients [2] | Making method A-ingredients [1] | Making method B-ingredients [2] | Making method C-ingredients [2] | Making method A-ingredients [2] |
| Polyolefin-based resin | Part | 49 | 80 | 49 | 49 | 49 |
| Hydrophilizing agent | Part | 40 | 20 | 40 | 40 | 40 |
| Inorganic powder | Part | 11 | — | 11 | 11 | 11 |
| Foaming agent | Part | 1 | 1 | 1 | 1 | 1 |
| Melt-stirring conditions | Temperature (° C.) | 150 | 180 | — | — | 150 |
|  | Time (minutes) | 15 | 20 | — | — | 15 |
|  | Stirring rotation speed (rpm) | 100 | 150 | — | — | 100 |
| Twin screw kneading conditions | Inlet temperature (° C.) | — | — | 130 | — | — |
|  | Midsection temperature (° C.) | — | — | 150 | — | — |
|  | Nozzle side temperature (° C.) | — | — | 170 | — | — |
|  | Screw rotation speed (rpm) | — | — | 100 | — | — |
| Extrusion-foaming conditions | Inlet temperature (° C.) | 150 | 150 | 150 | 150 | 150 |
|  | Midsection temperature (° C.) | 150 | 180 | 150 | 160 | 150 |
|  | Nozzle side temperature (° C.) | 160 | 200 | 160 | 180 | 190 |
|  | Screw rotation speed (rpm) | 100 | 100 | 100 | 150 | 100 |

Example 1

The ingredients listed in Table 2 other than the foaming agent were charged into a melt stirrer at proportions listed in Table 4, and kneaded and pulverized under the melt-stirring conditions listed in Table 4 to obtain a primary blend.

The primary blend and the foaming agent at the proportions listed in Table 4 are charged into a single screw extruder, and extrusion-foamed through a nozzle in water under the extrusion-foaming conditions listed in Table 4, and the foamed mass was immediately cut in water to obtain a foam (Example 1: making method A-ingredients [2]). The nozzle temperature was adjusted to 160° C.

Example 2

The ingredients listed in Table 2 other than the foaming agent were charged into a melt stirrer at proportions listed in Table 4, and kneaded and pulverized under the melt-stirring conditions listed in Table 4 to obtain a primary blend.

The primary blend and the foaming agent at the proportions listed in Table 4 are charged into a twin screw extruder, and extrusion-foamed through a nozzle in water under the extrusion-foaming conditions listed in Table 4, and the foamed mass was immediately cut in water to obtain a foam (Example 2: making method A-ingredients [1]). The nozzle temperature was adjusted to 200° C.

Example 3

The ingredients listed in Table 2 other than the foaming agent were charged into a twin screw extruder at proportions listed in Table 4, and kneaded and pelletized under the twin screw kneading conditions listed in Table 4 to obtain a primary blend.

The primary blend and the foaming agent at the proportions listed in Table 4 are charged into a single screw extruder, and extrusion-foamed through a nozzle in water under the extrusion-foaming conditions listed in Table 4, and the foamed mass was immediately cut in water to obtain a foam (Example 3: making method B-ingredients [2]). The nozzle temperature was adjusted to 160° C.

Example 4

All the ingredients listed in Table 2 were charged into a twin screw extruder at proportions listed in Table 4, and extrusion-foamed through a nozzle in water under the extrusion-foaming conditions listed in Table 4, and the foamed mass was immediately cut in water to obtain a foam (Example 4: making method C-ingredients [2]). The nozzle temperature was adjusted to 180° C.

Examples 5 to 16

Examples 5 to 8 used sodium bicarbonate as a foaming agent, and 930MB120 (trade name: EXPANCEL (Registered Trademark), manufactured by Japan Fillite Co., Ltd.) as a self-supporting (independent) foaming agent. Examples 9 and 12 used sodium bicarbonate as a foaming agent, and 930DU120 (trade name: EXPANCEL, manufactured by Japan Fillite Co., Ltd.) as a self-supporting (independent) foaming agent. Example 5 was extrusion-foamed through a nozzle in water under the same melt-stirring conditions and twin screw extrusion conditions as Example 2, and the foamed mass was immediately cut in water to obtain a foam (Example 5: making method A-ingredients [1]). The nozzle temperature was adjusted to 200° C. In Example 6, a foam was obtained in the same manner as Example 5, except that hot cutting was employed in place of underwater cutting. In Examples 7 to 9 and 12, foams were obtained by hot cutting.

In Examples 10, 11, 13 to 16, sodium bicarbonate was used alone as a foaming agent, and a foam was obtained by underwater cutting.

Comparative Example 1

A foam was obtained in the same manner as Example 1, except that the extrusion-foaming conditions and nozzle temperature were changed (Comparative Example 1: making method A-ingredients [2]). The nozzle temperature was adjusted to 190° C.

The physical properties of the foams of Examples 1, 2, and Comparative Example 1 obtained under the above-described production conditions are listed in Table 5. The apparent specific gravity and specific surface area ratio listed in Table 5 were calculated by the above-described measurement methods.

TABLE 5

| Appearance (visual observation) | | Example 1 Spheres having uneven surfaces | Example 2 Spheres having uneven surfaces | Comparative Example 1 Spheres having smooth surfaces |
|---|---|---|---|---|
| Apparent specific gravity | g/ml | 0.55 | 0.45 | 0.55 |
| Specific surface area ratio | (B/A) | 3.5 | 2.5 | 1.0 |

The results of the observation of appearance indicate that the foams of Examples 1 and 2 had a melt fractured surface, and the foam of Comparative Example 1 had a surface with no melt fracture. The foams of Example 1 and Comparative Example 1 had the same apparent specific gravity, which suggests that they have similar expansion ratios. However, their specific surface area ratios were markedly different. The fact suggests that the surface states of the forms of Example 1 and Comparative Example 1, more specifically the melt fractures are markedly different. From the above results, the production conditions according to the present invention is suitable for causing a melt fracture on the surface of the foam thereby increasing the surface area of the foam. The physical properties of the foams of Examples 3 and 4 are not described herein, but the foams have the same appearance as the foams of Examples 1 and 2, and have melt fractures suitable for the carrier for fluid treatment of the present invention.

The water treatment capacity of the foams of Examples 1 and 2 and Comparative Example 1 obtained under the above-described production conditions were evaluated as follows.

[Evaluation of Water-Sinking Properties]

30 ml (apparent volume) of the foam of Example 1 was measured in a 50 ml graduated cylinder. The foam was transferred to a 300 ml beaker, to which 200 ml of tap water was added, and the solution was entirely stirred for 10 to 15 seconds, and then allowed to stand. The solution was stirred and allowed to stand in the same manner day by day, and the number of days required for sinking the whole of the foam was recorded.

The water-sinking properties of the foams of Example 2 and Comparative Example 1 were evaluated in the same manner. The results of the evaluation are listed in Table 6.

TABLE 6

| Foaming agent | | Evaluation Example 1 Example 1 | Evaluation Example 2 Example 2 | Evaluation Example 3 Comparative Example 1 |
|---|---|---|---|---|
| Water-sinking property | Number of days | 0.5 to 1 | 2 to 3 | Not sinkable |

The results listed in Table 6 indicate that the foams of Examples 1 and 2 sank into water. In particular, the foam of Example 1 entirely sank in 0.5 to 1 day, which indicates that the foam has very excellent water-sinking properties. The reason for this is that the foams of Examples 1 and 2 were produced under the preferable production conditions according to the present invention, and had large specific surface areas. More specifically, the foams of Examples 1 and 2 have a melt fractured surface, which allows the hydrophilizing agent to be exposed at or projecting from the surface to introduce water into the surface and inside of the foam.

On the other hand, the foam of Comparative Example 1 did not sink. This is likely due to that no melt fracture is formed on the surface of the foam produced under the production conditions of Comparative Example 1, so that the hydrophilizing agent is not exposed at or projecting from the surface, and thus does not introduce water into the surface or inside of the foam.

[Evaluation of Denitrification Treatment]

The foams of Example 1 and Comparative Example 1 were subjected to denitrification treatment evaluation under the conditions listed in Table 7.

TABLE 7

| Foaming agent | | Evaluation Example 4 Example 1 | Evaluation Example 5 Example 1 | Evaluation Example 6 Comparative Example 1 |
|---|---|---|---|---|
| Experimental bath | 1 (liter) | 5 | 5 | 5 |
| Untreated water ($NO_3$—N) | mg/l | 600 | 3000 | 3000 |
| Untreated water inflow*[1] | 1 (liter)/day | 5 | 5 | 5 |
| Retention in carrier*[2] | 1 (liter) | 0.5 | 2.5 | 2.5 |
| Rate of retention in carrier*[3] | % | 10 | 50 | 50 |
| Treated water ($NO_3$—N) | mg/l | 6 or less | 20 or less | 1800 or less |
| Removal rate | % | 99 or more | 99 or more | 40 |

*[1]Retention time 24 hours
*[2]Apparent volume
*[3]Retention rate to bath capacity Sewage treatment capacity such as denitrification capacity involves two major factors: the surface state and sinking properties of the foam. When the surface of the foam is in a melt fractured state, the specific surface area increases, and thus the amount of fungi deposited on the foam increases, which contributes to the improvement of the treatment capacity. When the foam is floating, the foam is localized in the upper portion of the treatment bath, which decreases the number of contacts between the foam and sewage to deteriorate the treatment capacity of the foam. The treatment capacity of the foam was examined in terms of the denitrification capacity. Comparison between the evaluation examples 5 and 6 indicates that the difference in the above-described two items (the surface state and sinking properties of the foam) is reflected on the difference of the denitrification treatment capacity. The same results are likely obtained in sewage treatment such as BOD treatment or nitration treatment.

The foam of Examples 1, 2, and Comparative Example 1 were allowed to stand for 2 days in a room containing highly concentrated airborne dust. Detailed evaluation data of the adsorption rate (decrement of airborne dust) have not been obtained at this point, but it was visually observed that the carriers for fluid treatment of Examples 1 and 2, which have a melt fractured surface, were more heavily stained than the foam of Comparative Example 1. The fact suggests that the carriers of the present invention provide an excellent dust adsorption rate (decrement of airborne dust).

The carrier for fluid treatment of the present invention is composed of a foam having a melt fractured surface having many microscopic asperities. Therefore, the foam has a large surface area, and a hydrophilizing agent is exposed at or projecting from the surface of the foam, which improves water sinking properties of the carrier, and increases the amount of microorganisms deposited on the carrier. In addition, the carrier promptly and effectively adsorbs and/or removes dust, moisture, and floating microorganisms contained in a gas such as air.

The carrier for fluid treatment of the present invention may be composed of a regenerated polyolefin-based resin, and thus is regarded as an eco-friendly product.

In addition, according to the method of the present invention for making a carrier for fluid treatment, a carrier for fluid treatment having a high expansion ratio and excellent water-sinking properties can be continuously produced, which has been difficult under known techniques, contributing to the improvement of the production efficiency and cost reduction.

What is claimed is:

1. A carrier for fluid treatment comprising:
a foam containing 30 to 95% by weight of a polyolefin-based resin, and 5 to 70% by weight of a cellulose-based powdery hydrophilizing agent, the surface of the foam being in a melt fractured state having a specific surface area ratio represented by the following formula (1):

$$B/A = 1.5 \text{ to } 4.0 \qquad (1),$$

where A represents the apparent specific surface area of the foam, and B represents the specific surface area of the foam, wherein
the hydrophilizing agent is exposed at or projecting from the surface of the foam, and;
the polyolefin-based resin is a composition having a melt flow index of 5 to 25 g/10 min.

2. A carrier for fluid treatment comprising:
a foam containing 30 to 95% by weight of a polyolefin-based resin, 4 to 69% by weight of a cellulose-based powdery hydrophilizing agent, and 1 to 30% by weight of an inorganic powder, the surface of the foam being in a melt fractured state having a specific surface area ratio represented by the following formula (1):

$$B/A = 1.5 \text{ to } 4.0 \qquad (1),$$

where A represents the apparent specific surface area of the foam, and B represents the specific surface area of the foam, wherein
the hydrophilizing agent is exposed at or projecting from the surface of the foam, and;
the polyolefin-based resin is a composition having a melt flow index of 5 to 25 g/10 min.

3. The carrier for fluid treatment according to claim 1, wherein
the polyolefin-based resin is polyethylene, a mixture of polyethylene and polypropylene, a mixture of polyethylene and ethylene-vinyl acetate copolymer, a mixture of polyethylene, polypropylene, and ethylene-vinyl acetate copolymer, a mixture of polyethylene, polypropylene, and polystyrene, or a mixture of polyethylene, polypropylene, polystyrene, and ethylene-vinyl acetate copolymer.

4. The carrier for fluid treatment according to claim 1, wherein
the foam has an expansion ratio of 2 to 10, and an apparent specific gravity of 0.10 to 0.80 g/ml.

5. A method of making a carrier for fluid treatment, comprising steps of:
charging a foaming agent,
and charging a primary blend, which has been prepared by kneading 30 to 95% by weight of a polyolefin-based resin and 5 to 70% by weight of a hydrophilizing agent composed of a cellulose-based powder,
in a melt stirrer at a temperature not lower than the melting point of the polyolefin-based resin, followed by pulverization,
or in a multiscrew extruder at a temperature not lower than the melting point of the polyolefin-based resin, followed by pelletization,
into a single screw or multiscrew extruder, kneading them,
extrusion-foaming the kneaded mass in water, and then cutting the foamed mass with an underwater pelletizer,
or extrusion-foaming the kneaded mass in a vapor phase, and then hot cutting the foamed mass,
to obtain a foam,
the surface of the foam being in a melt fractured state having a specific surface area ratio represented by the following formula (1):

$$B/A = 1.5 \text{ to } 4.0 \qquad (1),$$

where A represents the apparent specific surface area of the foam, and B represents the specific surface area of the foam, wherein
the hydrophilizing agent is exposed at or projecting from the surface of the foam, and;
the polyolefin-based resin is a composition having a melt flow index of 5 to 25 g/10 min.

6. A method of making a carrier for fluid treatment, comprising steps of:
charging a foaming agent,
and charging a primary blend, which has been prepared by kneading 30 to 95% by weight of a polyolefin-based resin, 4 to 69% by weight of a hydrophilizing agent composed of a cellulose-based powder, and 1 to 30% by weight of an inorganic powder
in a melt stirrer at a temperature not lower than the melting point of the polyolefin-based resin, followed by pulverization, or in a multiscrew extruder at a temperature not lower than the melting point of the polyolefin-based resin, followed by pelletization, into a single screw or multiscrew extruder, kneading them, extrusion-foaming the kneaded mass in water, and then cutting the foamed mass with an underwater-pelletizer, or extrusion-foaming the kneaded mass in a vapor phase, and then hot cutting the foamed mass, to obtain a foam, the surface of the foam being in a melt fractured state having a specific surface area ratio represented by the following formula (1):

$$B/A=1.5 \text{ to } 4.0 \qquad (1),$$

where A represents the apparent specific surface area of the foam, and B represents the specific surface area of the foam, wherein the hydrophilizing agent is exposed at or projecting from the surface of the foam, and;

the polyolefin-based resin is a composition having a melt flow index of 5 to 25 g/10 min.

7. A method of making a carrier for fluid treatment, comprising steps of:

charging 30 to 95% by weight of a polyolefin-based resin, 5 to 70% by weight of a hydrophilizing agent composed of a cellulose-based powder, and a foaming agent, or optionally charging 30 to 95% by weight of a polyolefin-based resin, 4 to 69% by weight of a hydrophilizing agent composed of a cellulose-based powder, 1 to 30% by weight of an inorganic powder and a foaming agent, into a multiscrew extruder and kneading them at a temperature not lower than the melting point of the polyolefin-based resin, extrusion-foaming the kneaded mass in water, and then cutting the foamed mass with an underwater pelletizer, or extrusion-foaming the kneaded mass in a vapor phase, and then hot cutting the foamed mass, to obtain a foam, the surface of the foam being in a melt fractured state having a specific surface area ratio represented by the following formula (1):

$$B/A=1.5 \text{ to } 4.0 \qquad (1),$$

where A represents the apparent specific surface area of the foam, and B represents the specific surface area of the foam, wherein the hydrophilizing agent is exposed at or projecting from the surface of the foam, and;

the polyolefin-based resin is a composition having a melt flow index of 5 to 25 g/10 min.

8. The method of making a carrier for fluid treatment according to any one of claims 5 to 7, wherein the foaming agent is a chemical foaming agent or a combination of a chemical foaming agent and a self-supporting foaming agent.

9. The method of making the carrier for fluid treatment of any one of claims 5 to 7, wherein the nozzle temperature of the extruder is adjusted to a temperature in the range of 10° C. higher than the decomposition temperature or vaporization temperature of the foaming component contained in the foaming agent, to 60° C. higher than the melting point of the polyolefin-based resin, thereby bringing the surface of the foam to a melt fractured state, and exposing or projecting the hydrophilizing agent from the surface of the foam.

10. The carrier for fluid treatment according to claim 1, wherein the foam is produced by charging a polyolefin-based resin, a hydrophilizing agent composed of a cellulose-based powder, and a foaming agent into a multiscrew extruder and kneading them at a temperature not lower than the melting point of the polyolefin-based resin, said foaming agent is a chemical foaming agent or a combination of a chemical foaming agent and a self-supporting foaming agent, said melt fractured state of the surface of the foam is formed by an extruder where a nozzle temperature of the extruder is adjusted to a temperature in the range of 10° C. higher than the decomposition temperature or vaporization temperature of the foaming component contained in the foaming agent, to 60° C. higher than the melting point of the polyolefin-based resin, the hydrophilizing agent is exposed or projected from the surface of the foam, the kneaded mass is extrusion-formed in water, and the foamed mass is cut with an underwater pelletizer, or the kneaded mass is extrusion-foamed in a vapor phase, and the foamed mass is hot cut to obtain the foam.

11. The carrier for fluid treatment according to claim 2, wherein the foam is produced by charging a polyolefin-based resin, a hydrophilizing agent composed of a cellulose-based powder, a foaming agent, and an inorganic powder into a multiscrew extruder and kneading them at a temperature not lower than the melting point of the polyolefin-base resin, said foaming agent is a chemical foaming agent or a combination of a chemical foaming agent and a self-supporting foaming agent, said melt fractured state of the surface of the foam is formed by an extruder where a nozzle temperature of the extruder is adjusted to a temperature in the range of 10° C. higher than the decomposition temperature or vaporization temperature of the foaming component contained in the foaming agent, to 60° C. higher than the melting point of the polyolefin-based resin, the hydrophilizing agent is exposed or projected from the surface of the foam, the kneaded mass is extrusion-formed in water, and the foamed mass is cut with an underwater pelletizer, or the kneaded mass is extrusion-foamed in a vapor phase; and the foamed mass is hot cut to obtain the foam.

12. The carrier for fluid treatment according to claim 2, wherein the polyolefin-based resin is polyethylene, a mixture of polyethylene and polypropylene, a mixture of polyethylene and ethylene-vinyl acetate copolymer, a mixture of polyethylene, polypropylene, and ethylene-vinyl acetate copolymer, a mixture of polyethylene, polypropylene, and polystyrene, or a mixture of polyethylene, polypropylene, polystyrene, and ethylene-vinyl acetate copolymer.

13. The carrier for fluid treatment according to claim 2, wherein the foam has an expansion ratio of 2 to 10, and an apparent specific gravity of 0.10 to 0.80 g/ml.

14. The carrier for fluid treatment according to claim 1, wherein the foam is produced by charging a foaming agent, the foaming agent being a chemical foaming agent or a combination of a chemical foaming agent and a self-supporting foaming agent, and a primary blend, which has been prepared by kneading the polyolefin-based resin and the hydrophilizing agent composed of a cellulose-based powder in a melt stirrer at a temperature not lower than the melting point of the polyolefin-based resin, followed by pulverization, or by kneading the polyolefin-based resin and the hydrophilizing agent composed of a cellulose-based powder in a multiscrew extruder at a temperature not lower than the melting point of the polyolefin-based resin, followed by pelletization, into a single screw or multiscrew extruder, kneading them, extrusion-foaming the kneaded mass in water, and then cutting the foamed mass with an underwater pelletizer, or extrusion-foaming the kneaded mass in a vapor phase, and then hot cutting the foamed mass.

15. The carrier for fluid treatment according to claim 14, wherein
the nozzle temperature of the extruder is adjusted to a temperature in the range of 10° C. higher than the decomposition temperature or vaporization temperature of the foaming component contained in the foaming agent, to 60° C. higher than the melting point of the polyolefin-based resin thereby bringing the surface of the foam to a melt fractured state, and exposing or projecting the hydrophilizing agent from the surface of the foam.

16. The carrier for fluid treatment according to claim 2, wherein
the foam is produced by charging a foaming agent, the foaming agent being a chemical foaming agent or a combination of a chemical foaming agent and a self-supporting foaming agent, and a primary blend, which has been prepared by kneading the polyolefin-based resin, the hydrophilizing agent composed of a cellulose-based powder, and the inorganic powder in a melt stirrer at a temperature not lower than the melting point of the polyolefin-based resin, followed by pulverization, or by kneading the polyolefin-based resin, the hydrophilizing agent composed of a cellulose-based powder, and the inorganic powder in a multiscrew extruder at a temperature not lower than the melting point of the polyolefin-based resin, followed by pelletization, into a single screw or multiscrew extruder, kneading them, extrusion-foaming the kneaded mass in water, and then cutting the foamed mass with an underwater pelletizer, or extrusion-foaming the kneaded mass in a vapor phase, and then hot cutting the foamed mass.

17. The carrier for fluid treatment according to claim 16, wherein
the nozzle temperature of the extruder is adjusted to a temperature in the range of 10° C. higher than the decomposition temperature or vaporization temperature of the foaming component contained in the foaming agent, to 60° C. higher than the melting point of the polyolefin-based resin thereby bringing the surface of the foam to a melt fractured state, and exposing or projecting the hydrophilizing agent from the surface of the foam.

18. The carrier for fluid treatment according to claim 10, wherein
the nozzle temperature of the extruder is adjusted to a temperature between 160° C. and 200° C.

19. The carrier for fluid treatment according to claim 11, wherein
the nozzle temperature of the extruder is adjusted to a temperature between 160° C. and 200° C.

20. The carrier for fluid treatment according to claim 14, wherein
the nozzle temperature of the extruder is adjusted to a temperature between 160° C. and 200° C., thereby bringing the surface of the foam to a melt fractured state, and exposing or projecting the hydrophilizing agent from the surface of the foam.

21. The carrier for fluid treatment according to claim 16, wherein
the nozzle temperature of the extruder is adjusted to a temperature between 160° C. and 200° C., thereby bringing the surface of the foam to a melt fractured state, and exposing or projecting the hydrophilizing agent from the surface of the foam.

* * * * *